Patented June 6, 1939

2,161,697

UNITED STATES PATENT OFFICE 2,161,697

HYDROXYBENZOCARBAZOLE COMPOUNDS

Willy Broeg, Leverkusen-I. G. Werk, and Heinrich Morschel, Cologne Deutz, Germany, assignors to General Aniline Works, Inc., New York, N. Y., a corporation of Delaware No Drawing. Application February 13, 1933, Serial No. 656,622. In Germany February 18, 1932

7 Claims. (Cl. 260—315)

The present invention relates to new compounds of the carbazole series, more particularly it relates to compounds which may be represented by the general formula:

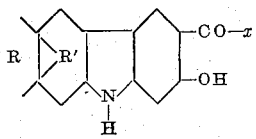

wherein R stands for a tetramethine chain attached to the benzene nucleus R' in the 5,6- or 7,8-position and $x$ stands for the radical of an arylamine.

Those compounds in which $x$ stands for OH are obtainable according to the synthesis of Kolbe by causing carbon-dioxide to act upon an alkalimetal salt of the corresponding 2-hydroxybenzocarbazole, or upon the 2-hydroxybenzocarbazole in the presence of an alkalimetal carbonate, at superatmospheric pressure and at elevated temperature.

Our new compounds are obtainable by reacting with the corresponding primary aromatic or heterocyclic amine free from a carboxylic acid or a sulfonic acid group, such as an amine of the benzene, naphthalene or carbazole series, upon the chloride or an ester of the carboxylic acid in an inert organic solvent, such as nitrobenzene, and in the presence of an acid- or water-binding agent at elevated temperature, or by causing the free carboxylic acid to act upon the isocyanic acid ester of the corresponding amine. Favorably the process is carried out by dissolving the carboxylic acid and the amine in an inert organic solvent, adding thereto phosphorus oxychloride or phosphorus trichloride, and heating, which process is more fully described in the examples.

The 2-hydroxybenzocarbazoles used as starting materials in our invention are obtainable, for example, by starting with such a 5,6- or 7,8-benzocarbazole as is substituted in the 2-position by a substituent which easily can be transformed into a hydroxy group, transforming the said substituent in the 2-position into a hydroxy group according to known methods, for example, in case of an amino group by diazotizing and boiling according to the method of Sandmeyer, in case of a sulfonic acid group by melting with a caustic alkali, and in case of an alkoxy group by treating with a desalkylating agent, such as aluminium chloride, and introducing the carboxylic acid group into the 3-position by causing carbon-dioxide to act upon an alkali metal salt of 2-hydroxy-5,6- or -7,8-benzocarbazole at superatmospheric pressure and at elevated temperature.

The new carboxylic acid arylamides are white to yellow substances, insoluble in water, soluble in organic solvents; they are valuable intermediate products in the manufacture of dyestuffs. These arylamides are especially valuable as coupling components when producing azodyestuffs by the methods usually used for producing ice colors. They can be used in much the same way as the 2.3-hydroxycarbazole carboxylic acid arylamides of French Patent 684,682.

The invention is illustrated by the following examples, without being limited thereto:

Example 1.—277 parts by weight of 2-hydroxy-5,6-benzocarbazole-3-carboxylic acid are heated with 152 parts by weight of 4-chloroaniline and 1500 parts by weight of toluene to 80° C. To this solution there are added in the course of one hour 70 parts by weight of phosphorus trichloride; after this, the mixture is heated to boiling until hydrochloric acid does not escape any longer. Soda is then added, the toluene is blown off with steam and the 2-hydroxy-5,6-benzocarbazole-3-carboxylic acid-p-chloroanilide of the formula:

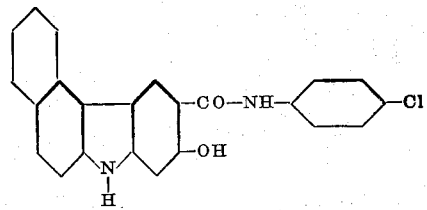

separated, having a melting point of 292° C., is filtered off. For removing remainders of 4-chloroaniline the mass is boiled with hydrochloric acid. A further purification can be performed by redissolving from aqueous caustic sodo solution.

In an analogous manner there is obtained from 2-hydroxy-5,6-benzocarbazole-3-carboxylic acid and α-napthylamine an arylamide of the following formula:

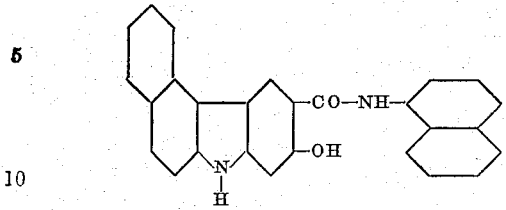

The 2-hydroxy-5,6-benzocarbazole-3-carboxylic acid is prepared as follows:

100 parts by weight of 5,6-benzocarbazole-2-sodium sulfonate, obtainable according to the method of Bucherer by condensation of 2,3-hydroxynaphthoic acid with 3-sulfophenylhydrazine in the presence of sodium bisulfite, are mixed with 23 parts by weight of powdered potassium hydroxide, and the mixture is fused and heated at 260-275° C., until no initial sulfonic acid is found any longer. After cooling, the melt is dissolved in water, the solution is boiled with the addition of decolorizing coal, filtered and acidified by the addition of hydrochloric acid. The 5,6-benzo-2-hydroxycarbazole separated, shows after drying and recrystallizing from chlorobenzene, the melting point of about 195° C.

The sodium salt of the 5,6-benzo-2-hydroxycarbazole is heated for about 10 hours at a temperature of about 280° C. and a carbon-dioxide pressure of about 50 atmospheres. After cooling, the melt is dissolved in hot water, the solution is filtered off from some undissolved matter, and, on acidifying the filtrate, the pale yellowish colored 5,6-benzocarbazole-2-hydroxy-3-carboxylic acid of the formula:

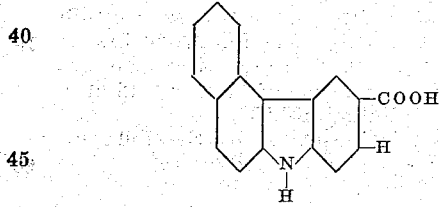

is precipitated. It is difficultly soluble in most organic solvents and gives crystalline alkali metal salts which are difficultly soluble in water. It melts at 245° C. with decomposition.

*Example 2.*—277 parts by weight of 2-hydroxy-7,8-benzocarbazole-3-carboxylic acid, obtainable analogously to the process described in Example 1 from 2-hydroxy-7,8-benzocarbazole, are heated to 80° C. with 160 parts by weight of 5-chloro-2-toluidine in 1600 parts by weight of chlorobenzene. Within the course of 1 hour 70 parts by weight of phosphorus trichloride are added. Then the mixture is heated to boiling for about 12 hours; after cooling, soda is added, and the chlorobenzene is driven off with steam. The 2-hydroxy-7,8-benzocarbazole-3-carboxylic acid-4'-chloro-2'-methyl-1'-phenylamide of the formula:

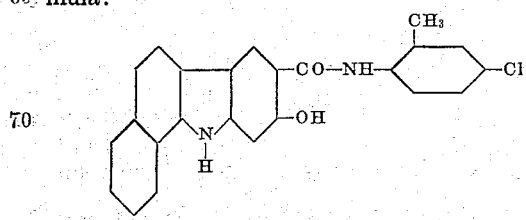

is filtered with suction, boiled with hydrochloric acid and washed with water. It has a melting point of 248° C.

In an analogous manner—

2-hydroxy-5,6-benzocarbazole-3-carboxylic acid yields:
    an m-chloroanilide of the melting point 273° C.
    an o-toluidide of the melting point 254° C.

2-hydroxy-7,8-benzocarbazole-3-carboxylic acid yields:
    an anilide of the melting point 251° C.
    an o-chloroanilide of the melting point 237° C.
    an m-chloroanilide of the melting point 249° C.
    a p-chloroanilide of the melting point 257° C.
    an m-nitranilide
    an o-anisidide
    a p-anisidide of the melting point 246° C.
    an o-toluidide
    a 2'-methoxy-4'-chloro-1'-phenylamide of the melting point 248° C.
    a 2'-methoxy-5'-chloro-1'-phenylamide of the melting point 246° C.
    a 2'-methyl-5'-chloro-1'-phenylamide of the melting point 243° C.
    a 2'-methyl-4'-methoxy-1'-phenylamide
    a 2'-carbazolylamide of the melting point above 300° C.

We claim:

1. The carbazole compounds of the general formula:

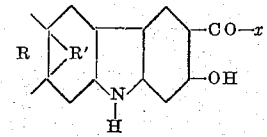

wherein R stands for a tetramethine chain linked to R' in 5,6- or 7,8-position and $x$ stands for the radical of an arylamine, being generally yellowish substances, insoluble in water, difficultly soluble in aqueous alkalies and in most organic solvents, and being valuable intermediate products in the manufacture of dyestuffs.

2. The carbazole compounds of the general formula:

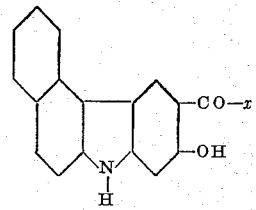

wherein $x$ stands for the radical of an arylamine, being generally yellowish substances, insoluble in water, difficultly soluble in aqueous alkalies and in most organic solvents, and being valuable intermediate products in the manufacture of dyestuffs.

3. The carbazole compounds of the general formula:

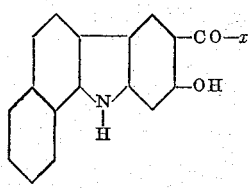

wherein $x$ stands for the radical of an arylamine, being generally yellowish substances, insoluble in water, difficultly soluble in aqueous alkalies and in most organic solvents, and being valuable intermediate products in the manufacture of dyestuffs.

4. The carbazole compounds of the general formula:

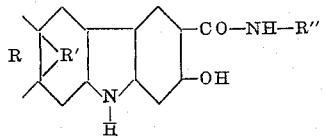

wherein R stands for a tetramethine chain linked to R' in 5.6- or 7.8-position and wherein R'' stands for a non-sulfonated and non-carboxylated radical of the group consisting of benzenes and naphthalenes, being generally yellowish substances, soluble in aqueous alkalies and in organic solvents, and being valuable intermediate products in the manufacture of azodyestuffs.

5. The 2-hydroxy-5.6-benzocarbazole-3-carboxylic acid-4'-chloroanilide of the melting point 292° C.

6. The 2-hydroxy-7.8-benzocarbazole-3-carboxylic acid-2'-methoxy-5'-chloroanilide of the melting point 246° C.

7. The 2-hydroxy-7.8-benzocarbazole-3-carboxylic acid-2'-methyl-5'-chloroanilide of the melting point 243° C.

WILLY BROEG.
HEINRICH MORSCHEL.